July 10, 1956 D. L. ARENBERG 2,754,238
METHOD OF BONDING AND ARTICLE THEREBY FORMED
Filed May 22, 1951
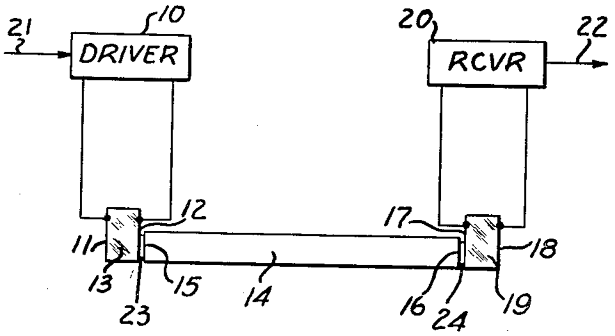
INVENTOR.
DAVID L. ARENBERG
BY
D. C. Snyder
Roderick B. Jones
ATTORNEYS United States Patent Office 2,754,238

Patented July 10, 1956

2,754,238

METHOD OF BONDING AND ARTICLE THEREBY FORMED

David L. Arenberg, Rochester, Mass.

Application May 22, 1951, Serial No. 227,589

18 Claims. (Cl. 154—128)

(Granted under Title 35, U. S. Code (1952), sec. 266)

The invention described herein may be manufactured and used by or for the Government of the United States of America for governmental purposes without the payment of any royalties thereon or therefor.

The present invention concerns a method of bonding the surfaces of material such as the large matching surfaces of ultrasonic delay-line elements, or the surfaces of glasses, crystals, ceramics, metals or other solids capable of maintaining a clean surface, and the invention also concerns the article thereby formed. In particular this invention concerns such a method and article in which there is evaporated in a vacuum and deposited on to the surfaces to be bonded a thin coat of a metal or alloy followed by pressing of the surfaces against each other while heated to a temperature below the melting point of the coat. Preferably there is used a soft metal or alloy having an appreciable rate of self diffusion and adhesion and in particular indium, gallium, thallium or an alloy thereof is desirable.

In forming ultrasonic delay lines for electronic applications where it is desired to delay a signal for a short period of time, it is necessary to bond together elements of the delay line, such as a piezoelectric transducer and the transmission bar, or to join two delay elements together of the same or different character. Both the crystal and bar conventionally are made of glass-like material. For example, the crystal can be made of quartz and the bar can be made of glass. The surfaces to be bonded are conventionally prepared as large flat surfaces and a bonding agent applied thereto. To afford a good acoustical match between the bonding agent and the delay line elements, to provide for low loss by absorption or reflection of acoustic energy in the cement, and to provide for transmission of ultrasonic energy over a wide range of temperature, it is necessary to have the cement layer of uniform thickness and preferably it is very thin in terms of the wavelength of sound used, for example, of the order of .001 inch or less at 10–30 mc./sec. Other applications may be found wherever it is necessary to maintain an accurate alignment of elements of glasses, etc., as in optical work.

One way of bonding quartz or glass surfaces to each other or to metals in the past, has been to use an organic cement or a type of solder. Cements with solvents do not form good bonds over large areas of impermeable material because they never dry out in the interior. Thermoplastic and thermosetting cements are usually so viscous that they do not form thin bonds. In addition organic cements do not match glass well acoustically and do not hold over a wide range of temperature.

The present invention overcomes these difficulties by evaporating and depositing on to the surfaces to be bonded a coat of a metal or alloy and particularly of indium, gallium, thallium or alloy thereof, then pressing the surfaces against each other while heating at a temperature below the melting point of the coat. When thallium is used it is desirable to effect assembly as well as evaporation and deposition in vacuum to prevent oxidation. This provides a bond that has a good acoustical match between the elements being bonded and the bonding agent. The bonding agent is a soft, ductile metal or alloy that deforms easily and relaxes thermal strains over a wide range of temperature. The indium, gallium, thallium or alloy adheres well to glass surfaces that are only moderately clean and no flux is required. The setting temperature is low and no great thermal strains are set up. Losses in the cement of acoustic energy by absorption or reflection are low. Ultrasonics can be transmitted over a wide range of temperature.

An object of the invention is to provide a method of bonding surfaces of material such as glasses, crystals, ceramics, metals or other solids capable of maintaining a clean surface, and the article thereby formed.

Another object is to provide a method of bonding surfaces of such material by evaporating in a vacuum on to the surfaces to be bonded, a thin coat of a metal and pressing the surfaces against each other at a pressure of about 1200 p. s. i. while heated at a temperature below the melting point of the coat, the pressing and heating being for a period of about 12 hours to about 24 hours. Preferably there is used a soft metal or alloy having an appreciable rate of self-diffusion and adhesion and in particular indium, gallium, thallium or an alloy thereof is desirable.

Another object is to provide in a delay line a first element having a surface, a second element having a surface and a thin layer of vapor-deposited bond between the surfaces and holding the elements together, the bonding agent being a metal or alloy and particularly indium, gallium, thallium or an alloy thereof.

Other objects and many of the attendant advantages of this invention will be readily appreciated as the same becomes better understood by reference to the following detailed description when considered in connection with the accompanying drawing wherein the single figure is a schematic diagram in block form of the present invention.

In the drawing, the driver circuit 10 is connected to faces 11 and 12 of a piezoelectric crystal 13. Piezoelectric crystal 13 is mounted at one end 15 of a rod or bar 14 of transmission material, and a second piezoelectric crystal 19 is located at the other end 16 of bar 14. The two faces 17 and 18 of crystal 19 are connected to a receiver circuit 20. An input connection 21 to driver circuit 10 provides means for applying a signal to be delayed to circuit 10 and an output connection 22 from receiver 20 provides the delayed signal. Connections 21 and 22 may be connected in any circuit where a signal is to be delayed. Piezoelectric crystals 13 and 19 are mounted on transmission bar 14 by means of bonds 23 and 24, respectively, that are shown of exaggerated thickness for illustration and that are formed in the following manner.

The surfaces to be bonded, for example crystal surface 12 and bar surface 15, are thoroughly cleaned and placed in a vacuum chamber. Pure indium or one of its alloys is placed on a tungsten filament or boat that is then heated electrically to evaporate the metal. After a thin opaque coat is deposited that has a matte finish, the vacuum is broken. The rate of evaporation should not be so great that balls of molten indium are projected on the glass surfaces. The surfaces are placed in opposition without being allowed to touch any grease or dirt in a dust-free room. No flux is used. It would be an advantage to perform all assembly operations in a vacuum, but no absolute necessity for this has been found. Pressure of about 1200 lbs./in. is applied in a vise that can maintain a constant pressure over a range of temperature. The load may be applied slowly or in such a manner that no air is trapped between the surfaces if the bond is to be set in air. The assembled pieces are placed in an oven and maintained at a constant temperature and pressure for 12–24 hours to form the final bond 23. Temperatures below 125° C. should be used with pure indium as this metal oxidizes rapidly above this point. Below 95° C. the bonding action is so slow that it is impractical. The optimum temperature will vary with the alloy. If tests show the bond is poor, it can sometimes be improved by recycling at a higher temperature and pressure.

The metal or alloy used is soft and has an appreciable rate of self diffusion and adhesion. It is desirable that oxidation and deterioration on contact with air be absent. The metal or alloy must adhere to the elements being joined as well as to itself. Indium, gallium, thallium and alloys thereof fulfill these requirements. When thallium is used it is desirable to effect assembly as well as the evaporation and deposition in vacuum to prevent oxidation.

The bond 23 is preferably very thin being of the order of about .001 inch or less and is of uniform thickness over its entire area.

Obviously many modifications and variations of the present invention are possible in the light of the above teachings. It is therefore to be understood that within the scope of the appended claims the invention may be practiced otherwise than as specifically described.

I claim:

1. A method of bonding matching surfaces of solid material capable of maintaining a clean surface, said method comprising the steps of evaporating in a vacuum on the surfaces to be bonded a thin layer of a metal selected from the group consisting of indium, gallium, and thallium, and pressing the surfaces against each other at a pressure of about 1200 p. s. i. while heated at a temperature below the melting point of the selected metal.

2. A method of bonding matching surfaces of solid material capable of maintaining a clean surface, said method comprising the steps of evaporating in a vacuum on to the surfaces to be bonded a thin coat of a metal selected from the group consisting of indium, gallium, and thallium, and pressing the surfaces against each other at a pressure of about 1200 p. s. i. while heated at a temperature below the melting point of the selected metal, the pressing and heating being for a period of about 12 hours to about 24 hours.

3. A method of bonding matching flat surfaces of solid material capable of maintaining a clean surface, said method comprising the steps of evaporating in a vacuum on to the surfaces to be bonded a thin coat of a metal selected from the group consisting of indium, gallium, and thallium, and pressing the coated surfaces against each other at a pressure of about 1200 p. s. i. while heated at a temperature below the melting point of the selected metal, the pressing and heating being for a period of about 12 hours to about 24 hours and carried out in a vacuum.

4. A method of bonding surfaces of ultrasonic crystal transducers to a solid ultrasonic transmission bar to form a delay line, said method comprising the steps of evaporating in a vacuum on the matching surfaces of the transducers and the delay line a thin layer of a metal selected from the group consisting of indium, gallium, and thallium, said layer having a matte finish, and pressing the surface of said transducer against the matching surface of said delay line at a pressure of about 1,200 pounds per square inch while heated at a temperature between 95° C. to 125° C. for a period of 12 to 24 hours.

5. A method of bonding surfaces of ultrasonic crystal transducers to a solid ultrasonic transmission bar to form a delay line, said method comprising the steps of evaporating in a vacuum on the matching surfaces of the transducers and the delay line a thin layer of metallic indium, said layer having a matte finish, and pressing the surface of said transducer against the matching surface of said delay line at a pressure of about 1,200 pounds per square inch while heated at a temperature between 95° C. to 125° C. for a period of 12 to 24 hours.

6. A method of bonding surfaces of ultrasonic crystal transducers to a solid ultrasonic transmission bar to form a delay line, said method comprising the steps of evaporating in a vacuum on the matching surfaces of the transducers and the delay line a thin layer of metallic gallium, and pressing the surface of said transducer against the matching surface of said delay line at a pressure of about 1,200 pounds per square inch while heated at a temperature between 95° C. to 125° C. for a period of 12 to 24 hours.

7. A method of bonding surfaces of ultrasonic crystal transducers to a solid ultrasonic transmission bar to form a delay line, said method comprising the steps of evaporating in a vacuum on the matching surfaces of the transducers and the delay line a thin layer of metallic thallium, and pressing the surface of said transducer against the matching surface of said delay line in a vacuum at a pressure of about 1,200 pounds per square inch while heated at a temperature between 95° C. to 125° C. for a period of 12 to 24 hours.

8. In an ultrasonic delay line, an ultrasonic crystal transducer having a flat surface suitable for the transmission of ultrasonic energy, a rod of ultrasonic transmission material having a flat surface, and a thin layer of bonding agent between the flat surface of said crystal transducer and the flat surface of said transmission bar for holding said transducer to said bar, said bonding agent being a metal selected from the group consisting of indium, gallium, and thallium.

9. In an ultrasonic delay line, an ultrasonic crystal transducer having a flat surface suitable for the transmission of ultrasonic energy, a rod of ultrasonic transmission material having a flat surface and a thin layer of bonding agent between the flat surface of said crystal transducer and the flat surface of said transmission bar for holding said transducer to said bar, said bonding agent comprising essentially metallic indium.

10. In an ultrasonic delay line, an ultrasonic crystal transducer having a flat surface suitable for the transmission of ultrasonic energy, a rod of ultrasonic transmission material having a flat surface and a thin layer of bonding agent between the flat surface of said crystal transducer and the flat surface of said transmission bar for holding said transducer to said bar, said bonding agent comprising essentially metallic gallium.

11. In an ultrasonic delay line, an ultrasonic crystal transducer having a flat surface suitable for the transmission of ultrasonic energy, a rod of ultrasonic transmission material having a flat surface and a thin layer of bonding agent between the flat surface of said crystal transducer and the flat surface of said transmission bar for holding said transducer to said bar, said bonding agent comprising essentially metallic thallium.

12. An ultrasonic delay line comprising an ultrasonic crystal transducer having a flat surface suitable for the transmission of ultrasonic energy, a rod of ultrasonic transmission material having a flat surface, a layer of bonding agent between the flat surface of said crystal transducer and the flat surface of said transmission bar for holding said transducer to said bar, said layer having a thickness less than 0.001 inch, said bonding agent being a metal selected from the group consisting of indium, gallium and thallium.

13. An ultrasonic delay line comprising an ultrasonic crystal transducer having a flat surface suitable for the transmission of ultrasonic energy, a rod of ultrasonic transmission material having a flat surface, a layer of bonding agent between the flat surface of said crystal transducer and the flat surface of said transmission bar for holding said transducer to said bar, said layer having a thickless less than 0.001 inch, said bonding agent essentially comprising metallic indium.

14. In an ultrasonic delay line, a piezoelectric crystal transducer having a flat surface, a rod of supersonic transmission material having a flat surface at one end, and a thin bonding layer therebetween of a metal selected from the group consisting of indium, gallium and thallium characterized by its formation by diffusion joining of two thermal evaporation coatings on said surfaces under elevated pressure at a temperature below the melting point of said coatings.

15. In an ultrasonic delay line, a piezoelectric crystal transducer, a rod of supersonic transmission material, the surface at one end of said rod matching the contour of a surface of said transducer, and a bonding layer between said surfaces of a metal selected from the group consisting of indium, gallium and thallium characterized by its formation by the diffusion of the metal under pressure at a temperature below its melting point from thermal evaporation coatings deposited on each of said surfaces in a vacuum.

16. In an ultrasonic delay line, a piezoelectric crystal transducer having a flat surface, a rod of ultrasonic transmission material, one end thereof having a flat surface, and a thin metallic bonding layer interposed between said surfaces for holding said transducer to said rod, the thickness and nature of said bonding layer being determined by metal diffusion under pressure and at a temperature below the melting point thereof from thin coats deposited on each of said flat surfaces in a vacuum by evaporation of a metal selected from the group consisting of indium, gallium and thallium.

17. In an ultrasonic delay line, a piezoelectric crystal transducer, a rod of ultrasonic transmission material, said transducer and said rod having matching surfaces, and a thin metallic indium bonding layer interposed between said surfaces, said layer being formed by metal diffusion under pressure below the melting point of indium from thin coats of indium deposited on each of said surfaces by evaporation in a vacuum.

18. An ultrasonic delay line as defined in claim 14 wherein said bonding layer essentially comprises metallic indium.

References Cited in the file of this patent

UNITED STATES PATENTS

| | | |
|---|---|---|
| 1,571,717 | Graner | Feb. 2, 1926 |
| 1,873,776 | McNeil | Aug. 23, 1932 |
| 1,965,114 | Drake | July 3, 1934 |
| 2,139,431 | Vatter | Dec. 6, 1938 |
| 2,281,280 | Gabor | Apr. 28, 1942 |
| 2,275,952 | Freeman | Mar. 10, 1942 |
| 2,283,705 | Stewart | May 19, 1942 |
| 2,427,348 | Bond et al. | Sept. 16, 1947 |
| 2,505,515 | Arenberg | Apr. 25, 1950 |
| 2,512,130 | Arenberg | June 20, 1950 |
| 2,544,320 | Hurd | Mar. 6, 1951 |
| 2,557,778 | Barry | June 19, 1951 |
| 2,557,983 | Linder | June 26, 1951 |
| 2,590,405 | Hansell | Mar. 25, 1952 |
| 2,671,746 | Brew | Mar. 9, 1954 |

OTHER REFERENCES

Indium, Scientiffic American, pages 154, 155, 156 of April 1944.